April 26, 1932. N. G. CAMPBELL ET AL 1,855,665
ART OF SHIPPING OR TRANSPORTING HOLLOW TILE, BRICK,
GYPSUM BLOCKS, PIPE, OR SIMILAR MATERIAL
Filed Nov. 11, 1930 4 Sheets-Sheet 1

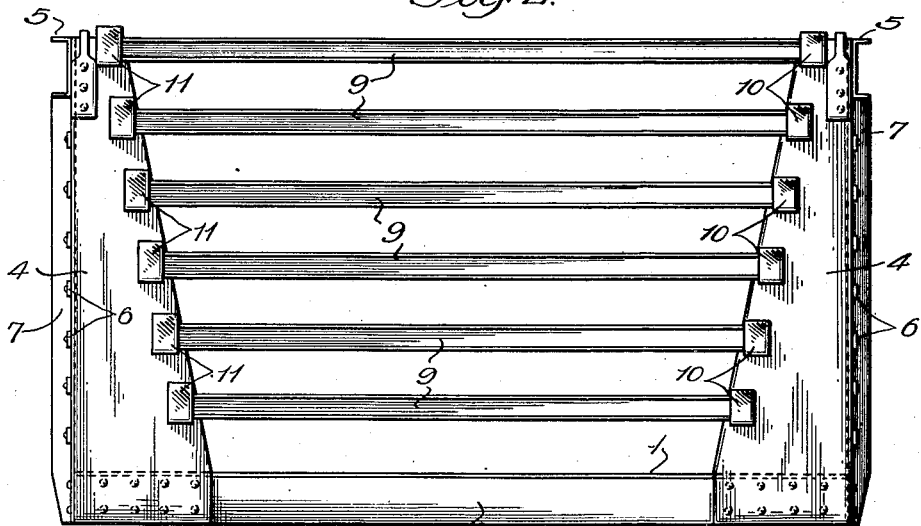
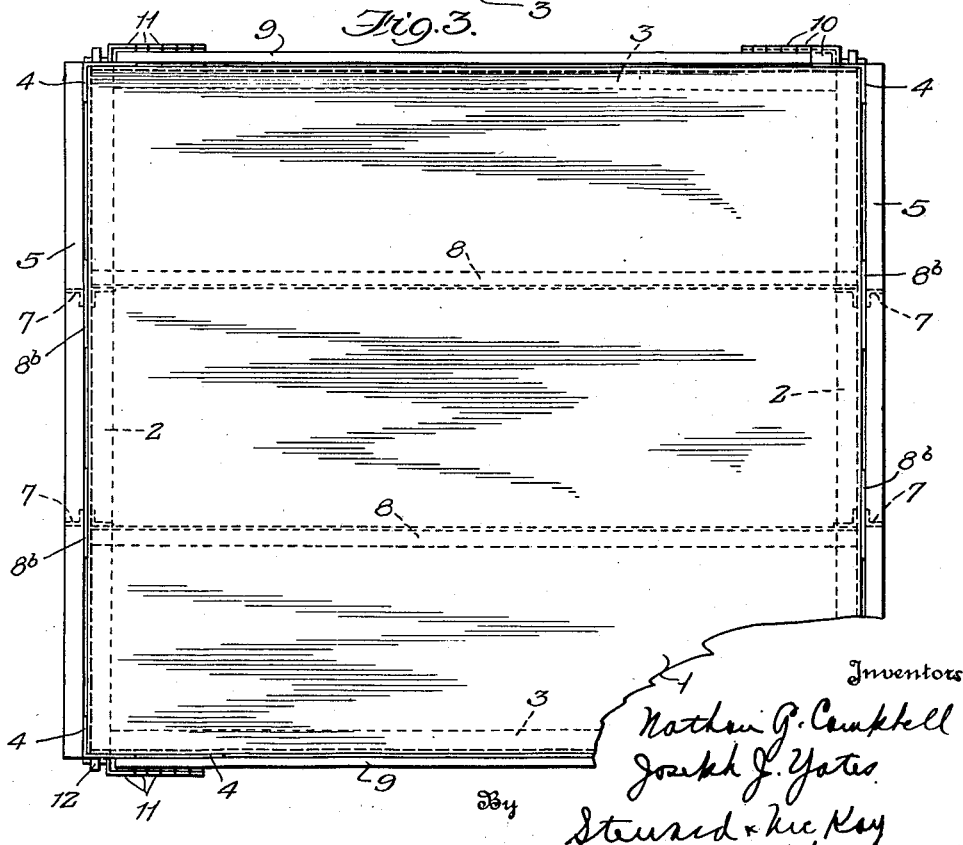

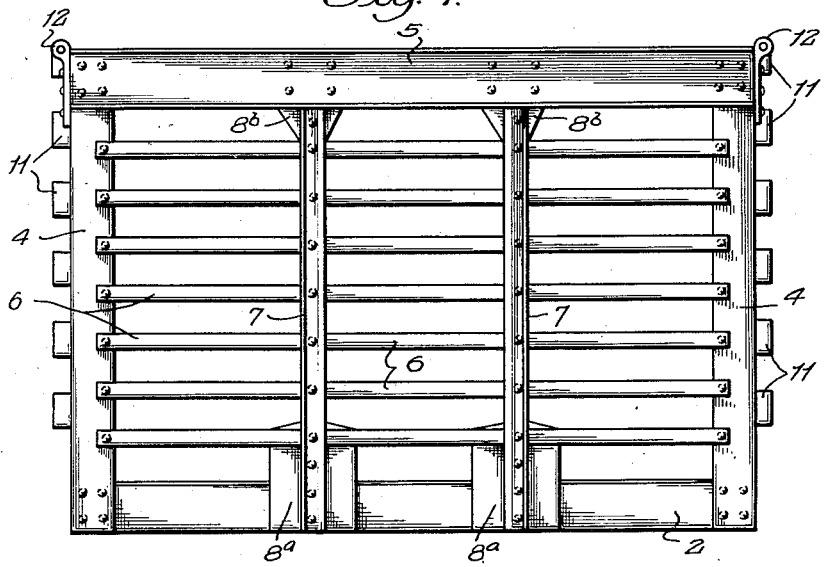
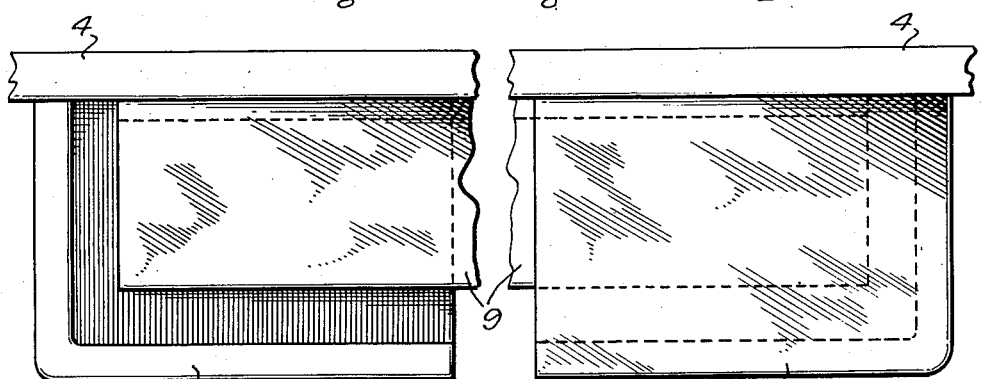
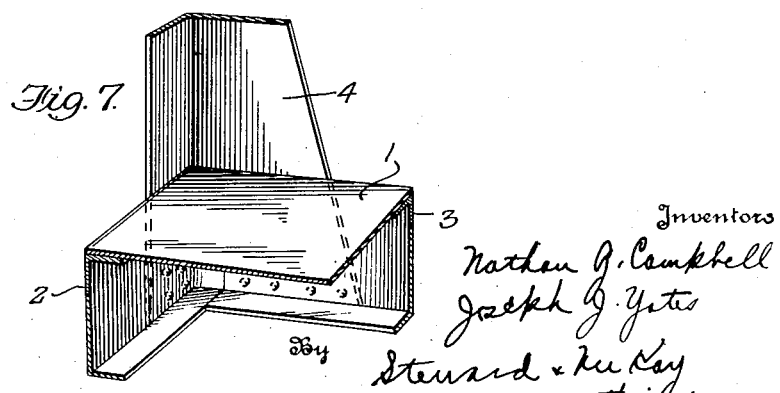

April 26, 1932. N. G. CAMPBELL ET AL 1,855,665
ART OF SHIPPING OR TRANSPORTING HOLLOW TILE, BRICK,
GYPSUM BLOCKS, PIPE, OR SIMILAR MATERIAL
Filed Nov. 11, 1930 4 Sheets-Sheet 4
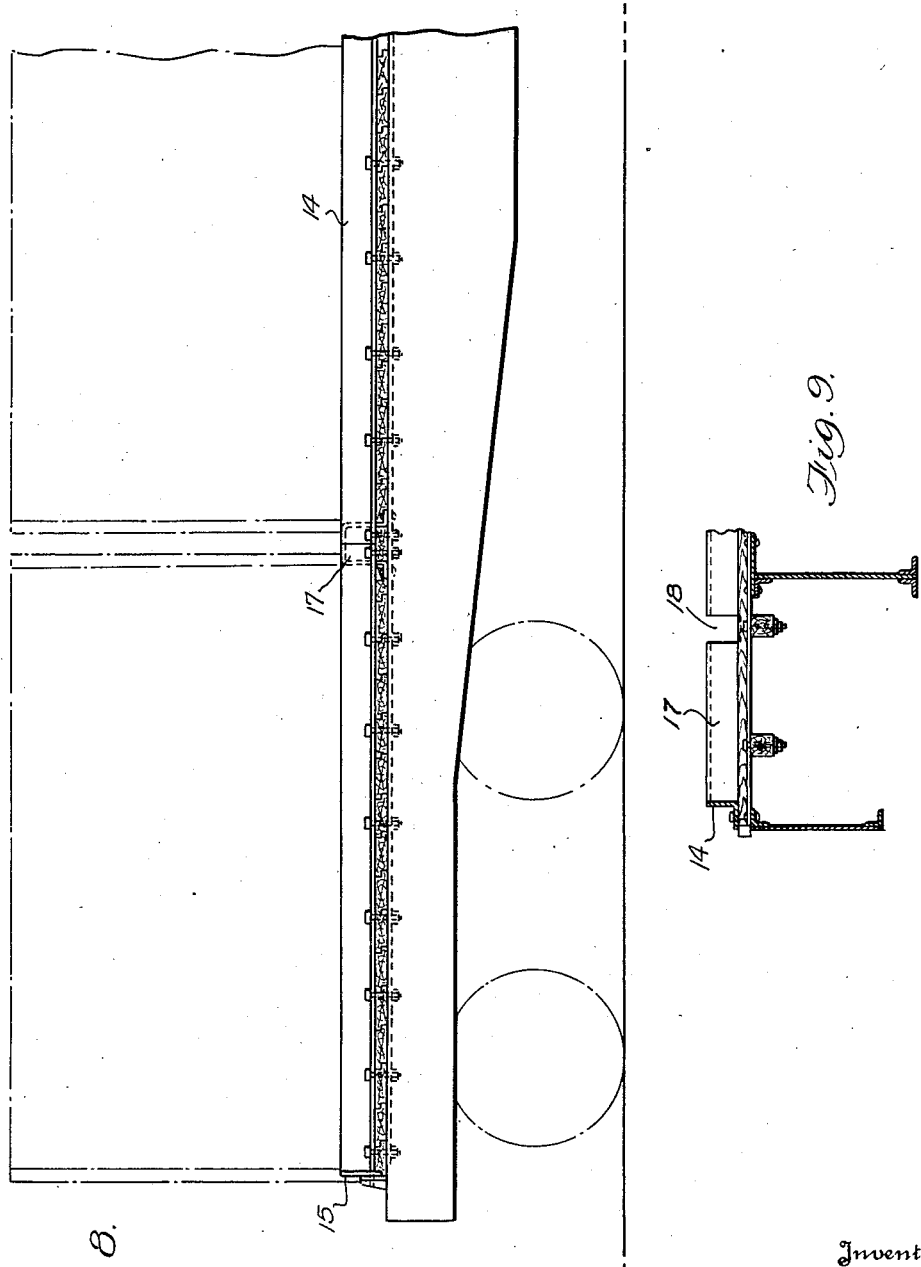

Patented Apr. 26, 1932

1,855,665

UNITED STATES PATENT OFFICE

NATHAN G. CAMPBELL, OF NEWARK, AND JOSEPH J. YATES, OF NORTH PLAINFIELD, NEW JERSEY, ASSIGNORS TO NEWARK WAREHOUSE COMPANY, OF NEWARK, NEW JERSEY, A CORPORATION OF NEW JERSEY

ART OF SHIPPING OR TRANSPORTING HOLLOW TILE, BRICK, GYPSUM BLOCKS, PIPE, OR SIMILAR MATERIAL

Application filed November 11, 1930. Serial No. 494,930.

This invention relates generally to the art of shipping or transporting hollow tile, brick, gypsum blocks, pipe or similar material and especially to containers for facilitating the handling of such material while being transported from one place to another.

Merchandise of the character referred to above has heretofore been transported from consignor to consignee by loading the individual pieces directly upon or into the carrier such as a railway car, a ship or a truck, which is then moved to the consignee destination where the material is unloaded piece by piece. If the individual pieces to be shipped are small and fragile, this method requires much time and manual labor, and involves loss through breakage and other causes by reason of frequent handling, as well as delay of the carrier while the material is being loaded and unloaded.

Another method of transportation utilizes containers into which the merchandise is loaded before being placed upon the carrier. The loaded containers are placed upon the carrier and delivered to the consignee destination, where the container is lifted off the carrier and unloaded. This method avoids delay of the carrier due to the shorter time required for loading and unloading the carrier and permits more time for careful packing, but owing to the construction of the containers heretofore in use, the difficulty of packing and unpacking the materials into and from the container, and the danger of breakage are practically as great as when they are loaded directly into the car.

If the container is open at the top only, the workman must bend over the side to place the materials within, or two men must be employed, one inside and one outside the container. If it is open at the side or end and closed by a door, all the pieces must be placed in the container before the door can be closed, and unless the materials form a stable structure when piled vertically, they are liable to fall out of the opening before the door is closed.

One object of our invention is to so construct a container that the articles to be shipped may be economically loaded at the point of manufacture and transported by carrier to the point of destination with a minimum of breakage, and without the necessity of manually handling the individual pieces.

Another object of our invention is to transport or ship conduits, hollow tile, etc., by truck in a manner that will result in a reduction of idling time of the trucks and a saving in breakage during the process of loading the trucks and transferring the container to the point of use.

Another object is to reduce the cost of handling the above mentioned materials, to reduce the breakage in handling and to facilitate such handling by railroad, truck or other carrier transportation.

Still other objects are to provide a container with an open side and means for enclosing the side from the bottom as the loading progresses.

More specific objects are to provide a container having an open side adapted to be closed by side rails so mounted as to prevent loss of the rails by jumping out during transit on the railroad, truck or other carrier; also to provide a container having an interior free of obstructions which might cause breakage to commodities carried therein.

Another object is to devise a freight carrier comprising a novel bed or floor structure supporting a plurality of removable containers in firmly interlocked relation against lateral movement but permitting the containers to be removed individually in a vertical direction.

In the accompanying drawings:

Figure 2 is a side view of one of our containers;

Figure 3 is a plan view of the same;

Figure 4 is an end view of the container;

Figure 5 is a top view on a larger scale of an end of one of the removable bars and the pocket in which it is received;

Figure 6 is a plan view of the other end of the bar and its pocket;

Figure 7 is a perspective view of a portion of the container platform and one of the standards at the corner thereof;

Figure 8 is a side view of a car with removable sections or containers of our own construction, and Figure 9 is a fragmentary view of the car body in transverse section.

Figure 1:
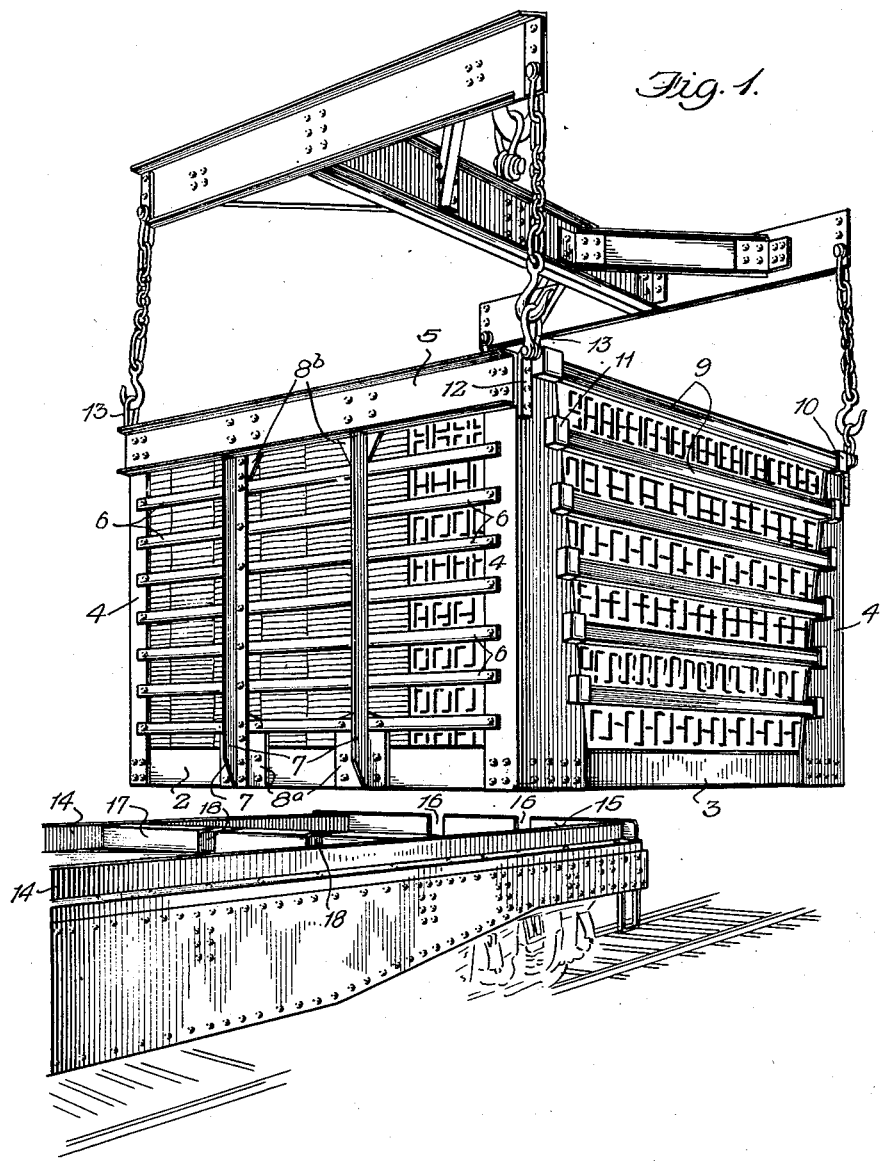
Figure 1 is a perspective view of one of our containers in the process of being placed upon or removed from a suitably prepared car platform.

In the drawings the numeral 1 designates the floor plate which forms the bottom or platform of one of our containers. The floor plate 1 is supported upon a base frame comprising a pair of channel bars 2, 2 forming end sills, and a pair of channel bars 3, 3 at right angles thereto forming side sills. Standards or angle posts 4 hold the channel bars in proper relation to one another, and serve as corner posts for the frame work of the container. The floor plate may be reinforced by channel bars 8 extending beneath the flooring from one end sill 2 to the other.

In the form illustrated each standard 4 has the form of a bent plate embracing a corner of the floor plate 1 and its supporting side and end sills 3 and 2, the flanges of the standard being riveted or otherwise firmly secured to the webs of the respective channel bars. Preferably the flanges of the bent plate are of different widths, for a reason to be explained hereinafter, the narrower flanges extending toward one another at the ends of the container, and the wider flanges extending along the sides of the container.

To the upper ends of the standards or angle posts 4 are fastened channel bars 5 which extend between the narrow flanges of the standards or angle posts 4 at the ends of the container and provide supporting members for skeleton end walls. Cross bars 6 also extend between the angle posts 4 and are braced intermediate the posts by angle irons 7 forming vertical ribs extending out from the end walls of the container. Angle irons 7 may be fastened to and supported by bottom and top plates or braces 8a and 8b, which are in turn fastened to the end sills 2 and the upper channel bars 5, respectively, by rivets or other suitable fastening means.

The end walls of the container are, as explained above, in permanent form but the side walls are so constructed that they may be removed, in order that the container may be left open on one or both sides for convenience in loading. The side walls are provided with closures in the form of removable bars or side rails 9, supported in pockets 10, 11. The pockets 10 are open at their inner sides only, for the insertion of one end of a side rail 9. The pockets 11 are open at their inner sides and tops so as to permit insertion of the other end of the side rail 9. Upon removal of the side rails, the end in pocket 11 is removed before the end in pocket 10. In the form of the invention illustrated the side rails 9 are channel bars, but obviously other forms of bars may be used instead.

Preferably the pockets 11 are made slightly higher than the width of a side rail, so that when once a side rail has been inserted with one end in the closed pocket 10 and the other end in pocket 11 there will be no danger of the rails jumping out. This insures freedom from loss of the side rails in transit, either on the railroad or other carrier, or on the truck.

It has already been pointed out that the wider flange of the bent plate forming standard 4 extends along the side of the container which has no permanent wall. In the preferred form of our invention this wide flange tapers in width from bottom to top, the wide bottom of the flange being riveted or otherwise secured to the channel bar in order to give the structure increased strength on the sides having no permanent wall structure. The top of the tapered flange must be wide enough to support the top pocket 10 or 11, and also an ear 12 to which are pivoted yokes or shackles 13 for engagement with hooks supported by a crane by which the container is lifted onto or off of the platform of the car or other carrier. As shown in Fig. 1, there are four shackles for each container, one at each corner.

The pockets are preferably electrically welded to the container, the surface of the flange of standard 4 forming the back walls of the pockets, but any other suitable means for securing the pockets may be used. The other parts are preferably held together by rivets and the ends of rivets coming through on the inside of the container are countersunk and flat, so as to make the interior of the container smooth, thus eliminating any projections which would be objectionable for obvious reasons. Any other suitable means for holding the parts together may be used, however.

When the standards 4 taper from bottom to top, and the pockets are arranged in staggered fashion, as illustrated best in Figure 2, the side rails 9 are of different lengths, the shortest rail being at the bottom and the rails increasing in length progressively toward the top of the container. It is obvious that the standards need not taper as shown, nor the pockets be staggered, but the pockets may be arranged one directly below the other to permit the use of side rails of a common length. The staggered arrangement of the pockets cooperating with rails of different lengths is desirable, however, because it permits the rails to be removed with greater ease than if the pockets were in vertical alinement.

It will be observed that we have provided a comparatively light, yet exceedingly strong and well braced container and that because of the open skeleton framework it is possible to observe from the outside the condition of the freight and the way it is placed. This makes it possible to check up at a glance to see if the articles have been properly packed, etc.

As shown in Figure 8 the containers constitute removable sections of a freight car which may be of the gondola type, comprising a platform upon which are mounted side and end stops 14 and 15 respectively. The end stop 15 may be a flat plate or an angle iron, and the side stops are angle irons as shown in Figure 9. The end stops are provided with notches or openings 16 so as to clear the ribs 7 when the container is in place. Intermediate cross stops 17 separate the space enclosed by the stops 14, 15 into cells or pockets, into each of which one of the containers fits. The intermediate stops are U-shaped in cross section as shown in Fig. 8, the edges of the intermediate stops or bars being provided with flanges. These flanges are secured to the sills of the car, there being openings in the flooring through which the stops or bars project, the floor boards being fitted to the bars.

The intermediate cross stops are also provided with openings 18 into which ribs 7, 7 of adjacent containers project. Obviously the channel bars forming the intermediate stops 17 must be at least as wide as the combined width of the angle irons forming ribs 7 on adjacent containers facing one another, in order that there shall be sufficient room between adjacent containers to prevent the ribs 7 on the respective containers from interfering with one another.

When the containers are properly positioned in the cells formed by the end stops, side stops and intermediate cross stops, they are locked against lateral movement but can be removed individually in a vertical direction.

In using our invention as applied to railroad transportation, for example, the cars carrying the containers are placed on a convenient railroad siding at the manufacturer's plant, where the cars may be loaded. In order facilitate and reduce the cost of loading, the side bars are removed to allow free access to the interior of the containers and the sides are either replaced as the loading progresses or upon its completion. This results in a material saving when compared to loading box cars of the usual construction, in that the maximum distance loaders must move the material by hand when using our invention is less than half the distance required in box car loading.

The loaded container or containers are then transported by rail to a railroad delivery yard convenient to the point of use, where they are lifted from the car to the truck without manually handling the individual pieces in the container. This operation results in a material saving of the idling time of the truck or trucks, and a saving in cost and breakage when compared to handling of each individual piece or article.

The loaded container or containers are then transported by truck to the point of use, where they may be conveniently unloaded either as a unit or by removing the side bars and manually handling the pieces.

The removable sides of the unloaded container are then replaced and the container returned by a truck to the railroad delivery yard and reloaded on a railway car for further consignment.

The use of a container with removable sides results in a material saving, not only in loading it at the point of manufacture, but in unloading at the point of use.

The use of our container also results in a saving of cost and handling of the merchandise when compared with box car loading, in that the cost operation of moving the individual pieces of merchandise by hand from the car to the truck is avoided.

A further saving that may result from the use of the container is that at manufacturing plants properly equipped, the unloaded container may be removed from the car, taken to remote points of the plant, loaded, returned and replaced on the car, thus saving rehandling of the merchandise.

As the point of use the container with proper equipment may be taken from the truck, stored and unloaded at convenient times, thus saving the idling time of trucks that would result if the merchandise of the containers were unloaded directly from the trucks.

The containers, while generally having a maximum capacity of about 15 tons, may be made of any size that can be conveniently handled by railroad car, truck, or other carrier. The size of the containers now in use is such that four containers can be loaded on one car and each container has a capacity of one truckload, so that when a car containing loaded containers is placed in the railroad delivery yard, one container may be lifted from the car and placed on the truck in a period not exceeding two minutes.

We do not limit ourselves to the exact forms of the parts as shown in the drawings, since many of the details may be changed without departing from the spirit and scope of the invention as defined in the appended claims.

What is claimed is:

1. The combination with a car running gear and a platform having side and end stops and cross stops forming a plurality of cells, of containers fitting into said cells and provided with vertical ribs at their ends, the cross stops having a thickness at least as great as the combined depth of the two ribs projecting from adjacent containers and facing each other, and the end and cross stops having recesses to receive said ribs.

2. A car having a platform, sills and a cross bar U-shaped in cross section with outwardly projecting flanges at its edges, the flanges being secured to the sills of the car and the body of the bar projecting upward through the platform.

3. A container for use in railway transportation, having an opening in one wall, removable bars for closing the opening, and pockets for holding the ends of the bars, one pocket being open at one side only, and the other being open at the top and one side, the front wall of the last named pocket being higher than the front wall of the first named pocket.

4. In a freight container, a base frame comprising side and end sills formed of channel bars arranged with their webs extending vertically and their flanges inwardly, and means securing the side and end sills in fixed relation comprising an angle post embracing each corner of said base frame, and flooring supported upon the upper flanges of said side and end sills.

5. In a freight container, a base frame comprising side and end sills, means securing the side and end sills in fixed relation comprising an upright angle plate embracing each corner of said base frame with a wide flange extending along and secured to the side sill and a narrower flange secured to the end sill, permanent end wall structure supported by said narrow flanges, and removable side wall structure supported between said wide flanges.

6. In a freight container, a base frame comprising side and end sills formed of channel bars, means securing the side and end sills in fixed relation comprising an upright angle post embracing each corner of said base frame with a wide flange extending along and secured to the side sill, and a narrower flange secured to the end sill, permanent end wall structure supported by said narrow flanges, and removable side wall structure supported between said wide flanges, said wide flanges being tapered from the bottom of the base frame to the top.

7. In a freight container, a base frame comprising side and end sills formed of channel bars and end posts embracing said channel bars at four corners to hold said bars in fixed relation, permanent end wall structure supported at the ends of said container between flanges of said angle posts, and removable side wall structure extending between other flanges of said angle posts comprising horizontal bars supported in pockets carried by said other flanges.

8. A freight container comprising a floor plate supported on channel bars, angle posts embracing said channel bars at four corners of said container, permanent end wall structure supported by said angle posts at two ends of said containers, removable side wall structure supported by said angle posts on two sides of said container, and a shackle attached to each of said angle posts to facilitate lifting said container.

9. A freight container comprising a floor plate supported on channel bars, angle posts embracing said channel bars at four corners of said container, permanent wall structure supported by said angle posts on a plurality of sides of said container, removable side wall structure supported by said angle post on at least one side of said container, and means on each of said angle posts to permit lifting said container.

10. A container for bulk transportation of relatively small articles comprising a base frame comprising side and end sills, a floor carried by said base, means securing the side and end sills in fixed relation comprising an angle post secured to adjacent side and end sills at each corner of the base frame, skeleton end walls permanently secured to said angle posts, and means providing skeleton side walls removably secured to said angle posts.

In testimony whereof we hereunto affix our signatures.

NATHAN G. CAMPBELL.
JOSEPH J. YATES.